United States Patent [19]

Frankel

[11] Patent Number: 4,910,395

[45] Date of Patent: Mar. 20, 1990

[54] OPTICAL TRACKING SENSOR INCLUDING A THREE-SIDED PRISMATIC LIGHT SPLITTER

[76] Inventor: Michael Frankel, 1855 Shirley La., Apt. A7, Ann Arbor, Mich. 48105

[21] Appl. No.: 318,244

[22] Filed: Mar. 3, 1989

[51] Int. Cl.⁴ .................................................. G01J 1/20
[52] U.S. Cl. ................................. 250/203.3; 356/152; 250/227.29; 350/169
[58] Field of Search .................. 250/203 R, 205 S; 356/141, 152; 350/169, 170; 244/3.16; 126/425

[56] References Cited

U.S. PATENT DOCUMENTS

| | | | |
|---|---|---|---|
| 3,137,794 | 6/1964 | Seward | 250/216 |
| 3,478,219 | 11/1969 | Nutz | 250/220 |
| 3,603,686 | 9/1971 | Paine et al. | 250/203 R |
| 3,800,146 | 3/1974 | Brunkhorst et al. | 250/203 R |
| 4,006,356 | 2/1977 | Johnson et al. | 250/203 R |
| 4,132,888 | 1/1979 | Kondo | 250/204 |
| 4,225,781 | 9/1980 | Hammons | 250/203 |
| 4,234,145 | 11/1980 | Leiboff | 244/3.16 |
| 4,297,572 | 10/1981 | Carlton | 250/203 S |
| 4,361,758 | 11/1982 | Rotolo | 250/203 S |
| 4,467,787 | 8/1984 | Ueda | 126/425 |
| 4,498,768 | 2/1985 | Holl | 250/203 S |
| 4,594,470 | 6/1986 | Headrick | 250/203 S |
| 4,628,142 | 12/1986 | Hashizume | 250/203 S |
| 4,711,998 | 12/1987 | Malek | 250/203 S |
| 4,717,822 | 1/1988 | Byren | 244/3.16 |
| 4,740,682 | 4/1988 | Frankel | 250/203 |

FOREIGN PATENT DOCUMENTS

| | | |
|---|---|---|
| 57-84949 | 5/1982 | Japan. |
| 678465 | 8/1979 | U.S.S.R. . |

*Primary Examiner*—David C. Nelms
*Assistant Examiner*—Stephone B. Allen
*Attorney, Agent, or Firm*—Laurence R. Brown; Alfred J. Mangels

[57] ABSTRACT

An improvement to a precise optical tracking system is described. The system is comprised of a three-sided transparent pyramid with a sharp vertex. The pyramid is used to split the incident beam into three parts, which are transmitted to respective photodetectors. The signals from the photodetectors are used for tracking. This invention makes several important improvements to an optical tracking system. The amount of energy incident on each photodetector is increased by 33% over a known four-detector system. The sensor inherently possesses a point vertex formed by three inclined surfaces, regardless of manufacturing tolerances. This directly contributes to increased sensor accuracy in comparison to known four-sided splitters. By reducing the number of sensors to three, the system's mechanical and electronic size and complexity is reduced.

10 Claims, 2 Drawing Sheets

OPTICAL TRACKING SENSOR INCLUDING A THREE-SIDED PRISMATIC LIGHT SPLITTER

BACKGROUND OF THE INVENTION

1. FIELD OF THE INVENTION

This invention relates generally to the use of a beam splitter for tracking and stabilizing light targets, and more particularly to a three-sided tracking sensor that employs three light detector elements.

2. DESCRIPTION OF THE RELATED ART

Various systems for the detection of the departure of a tracked point light target from an axis passing through the center of the tracking system are known. However, the known devices make use of a four-sided light splitter or of a four element detector for target tracking. For example, U.S. Pat. No. 4,234,145, which issued Nov. 18, 1980, to T. Leiboff, utilizes a lens and four photodetectors arranged in a square array. That system lacks tracking precision due to the physical gap necessary to separate the individual photodetectors.

In U.S. Pat. No. 4,225,781, which issued Sept. 30, 1980, to B. Hammons, a pyramidal tracking device is provided to shade photodetectors on each side of the pyramid when the base of the pyramid, which is the top of the tracking device, is facing the sun. However, this system being specifically designed as a sun tracker, blocks most of the light and cannot be used for tracking faint point light targets. U.S. Pat. No. 3,478,219, which issued Nov. 11, 1969, to G. Nutz, is intended as a sun tracker and utilizes a pyramidal prism to reflect the light laterally to respective photodetectors. U.S.S.R. Inventor's Certificate No. 678,465 utilizes a four-sided pyramid to refractively split a light beam into four components that are used for tracking. The tracking precision of that sensor is limited by the precision of the apex formed by the intersection of the four inclined sides of the pyramid.

Because the minimum number of components to determine the two-dimensional deviation of a tracked point light source is three, and because each of the above-identified tracking sensors has four components, one of the components is redundant.

It is an object of the present invention to provide a highly reliable and inexpensive tracking system.

It is another object of the present invention to provide a tracking sensor for use with extremely weak light sources having image diameters on the order of microns.

It is a further object of the present invention to provide a sensor having increased sensitivity by reducing the number of required light components to three.

It is a still further object of the present invention to increase the tracking precision of a tracking sensor by utilizing a sub-micron apex naturally formed by three intersecting inclined planes.

SUMMARY OF THE INVENTION

Briefly stated, in accordance with one aspect of the present invention, an optical tracking device is provided for tracking a light target. The device includes a transparent light splitter positioned to receive a light beam from a light source and to refract and divide the light beam into three individual output light beams. The splitter has an axis and a transverse planar surface perpendicular to the axis, and includes three inclined, intersecting planar faces that are inclined relative to the axis at substantially the same angles to define a three-sided pyramidal structure that includes a sharply pointed apex. Receptors are provided for receiving the individual output light beams and for providing an output signal representative of the intensity of the respective individual light beams that impinge upon the receptor means.

DESCRIPTION OF THE PREFERRED EMBODIMENTS

Figure 1:
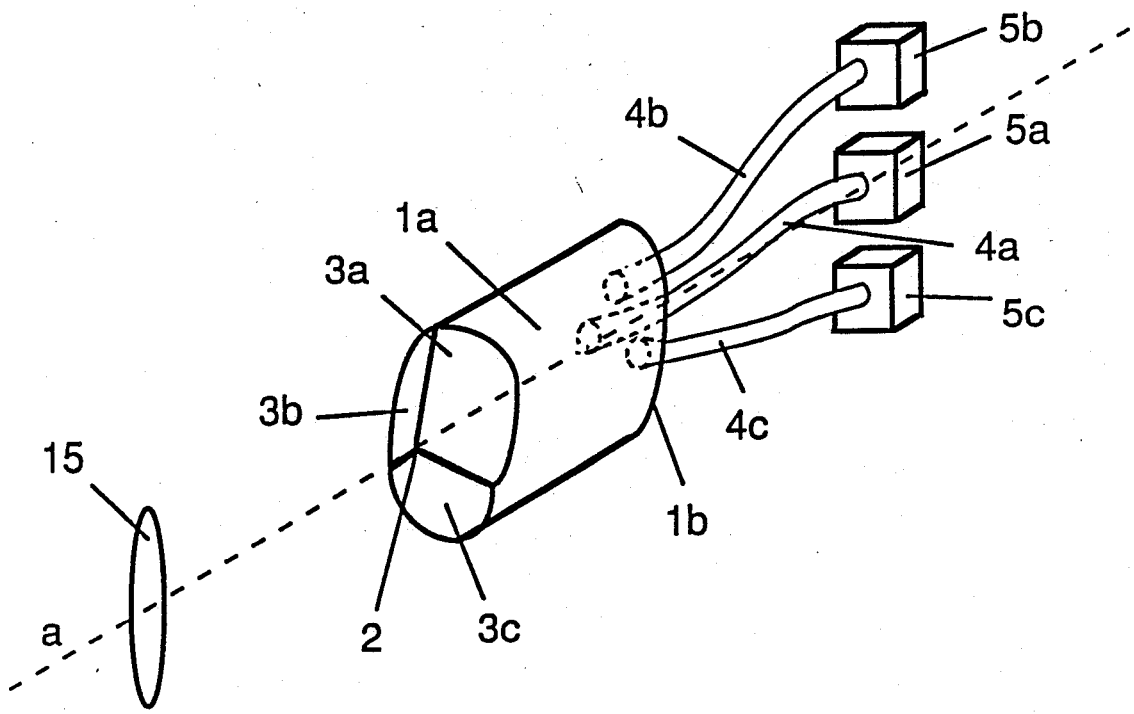
FIG. 1 is a perspective view of an embodiment of a tracking sensor in accordance with the present invention, in the form of a three sided light splitter.

Referring now to the drawings, and particularly to FIG. 1 thereof, there is shown a transparent beam splitter 1 that can be of any desired cross section and that includes a body portion 1a, a first face 3 symmetrical with axis a, and a second face 1b spaced axially from first face 3. First face 3 is defined by three planar surfaces 3a, 3b, and 3c, each of which is inclined at an acute angle relative to axis so as to define a triangular pyramid having an apex 2.

Adjacent to second face 1b are three fiber optic transmission links 4a, 4b, and 4c, that are positioned relative to beam splitter 1 so that one end of each link receives light that passes through beam splitter 1 from first face 3. The other ends of each of links 4a, 4b, and 4c face respective radiant energy detectors 5a, 5b, and 5c, which each provide respective output signals proportional to the intensity of the light that passes through beam splitter 1 and through the respective fiber optic links. In operation, and referring to FIGS. 1 and 2, the optical system in accordance with the present invention operates as follows. A light beam from a light point target (not shown) is focused by a converging lens 15 so that the axis of the incident light beam lies on the axis of the splitter and impinges onto the apex 2, so that equal quantities of light fall on each of planar surfaces 3a, 3b, and 3c of splitter 1. The fractions of the beam falling onto the inclined planar surfaces 3a, 3b and 3c are refracted relative to the axis of the splitter, and pass through the splitter to emanate as three divergent output light beam fractions. Each of the output light beam fractions enters a respective fiber optic link 4a, 4b, and 4c, which each transmit the respective output beam fractions to respective radiant energy detectors 5a, 5b and 5c.

Figure 2:
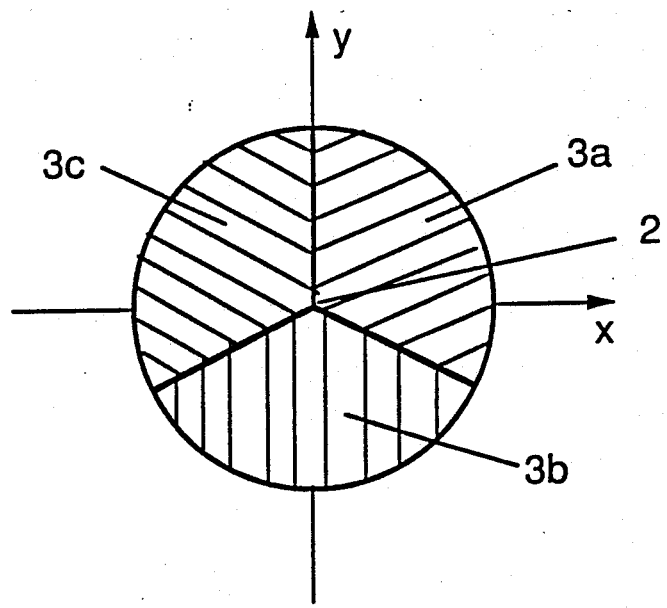
FIG. 2 is an axial view of the light splitter shown in FIG. 1 superimposed on a cartesian coordinate system.

As the light point target moves transversely relative to the axis of the light splitter, and within the X—Y plane shown in FIG. 2, the light beam from the target shifts relative to the apex 2 of the pyramid 1 and the relative strengths of the output beam fractions change, whereas their directions remain unaffected. Radiant energy detectors 5a, 5b and 5c provide output signals that are proportional to the radiant energies of the respective output beam fractions that emanate from the respective fiber optic links 4a, 4b and 4c.

Referring to FIG. 2, the signal transformation from the three component system to the cartesian coordinates necessary for servo-motor control can be accomplished as follows. When the axis of the incident light beam shifts relative to the apex 2 of the splitter 1, the quantity of light incident on each of inclined planes 3a, 3b, and 3c is not equally distributed. The difference between the quantity of light that impinges on each of inclined planes 3a and 3c can be used to determine the deviation of the incident light beam axis along the X-axis. The difference between one-half of the sum of the energies of the light incident on inclined planes 3a and 3c and the energy incident on inclined plane 3b provides the deviation of the incident light beam axis along the Y-axis. Consequently, when the X and Y coordinates of the axis of the incident light beam is known, both X and Y axis control of the light source can be achieved to shift the splitter so that the splitter axis is coincident with the incident light beam axis.

Figure 3:
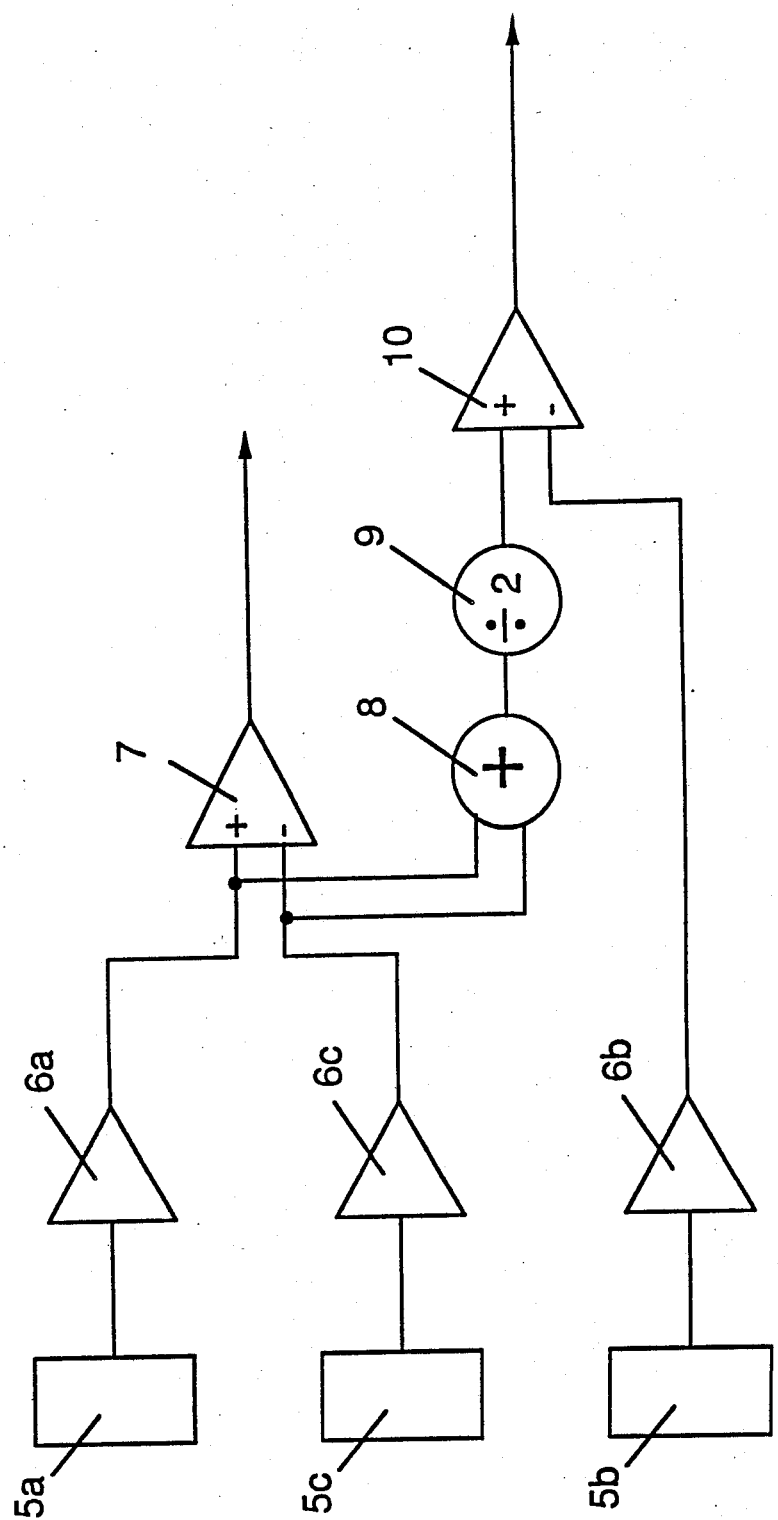
FIG. 3 is a schematic circuit diagram showing one form of control system for controlling the orientation of the tracking sensor shown in FIG. 1.

FIG. 3 shows one form of electronic control circuit for shifting the beam splitter to adjust the position of the beam splitter axis relative to the axis of an incident light beam. The signal from each of photodetectors 5a, 5b, and 5c is amplified by respective amplifiers 6a, 6b, and 6c. The output signals from amplifiers 6a and 6b provide the inputs for differential amplifier 7, within which the signals are subtracted from each other to provide a difference signal as an output signal from differential amplifier 7. The difference signal from differential amplifier 7 is provided as an input to an X-axis servomotor control circuit (not shown) of a type well known to those skilled in the art.

Similarly, to obtain the Y-axis servo-motor control signal, the output signals from each of amplifiers 6a and 6c are added together in adder circuit 8, and that sum is divided in half in a divider circuit 9 to provide a first input for differential amplifier 10. The output from amplifier 6b provides a second input for differential amplifier 10, and one of the input signals to differential amplifier 10 is subtracted from the other to provide an output control signal that serves as an input signal to a Y-axis servomotor control circuit (not shown). Thus, the position of the beam splitter can be quickly and accurately controlled relative to the incident light beam to provide the desired orientation, and thereby provide precise optical tracking.

This invention makes several important improvements to an optical tracking sensor. The amount of energy incident on each photodetector is increased by 33% over the four-detector systems, thereby increasing the sensitivity of the present invention relative to the four-detector systems. Furthermore, the sensor in accordance with the present invention inherently provides a sharply pointed apex defined by three intersecting inclined surfaces regardless of manufacturing variations, as opposed to the considerable difficulty, because of manufacturing tolerances, of providing a sharply pointed apex where four intersecting inclined surfaces are provided. That result directly contributes to increased sensor accuracy in comparison to the four-sided splitters. Moreover, as a result of reducing the number of sensors to three, the mechanical and electronic size and complexity of the system is reduced.

Although one embodiment of the present invention has been illustrated and described in detail, other embodiments of the system which function in a similar manner can also be provided. As merely one example, the optical fibers can be eliminated by positioning semiconductor photodetectors directly at the end of the beam splitter from which the individual beam fractions emanate. Additionally, the transparent beam splitter can be sealed or otherwise carried in a housing having a transparent window adjacent to the beam splitter apex to protect the apex from damage.

Although particular embodiments of the present invention have been illustrated and described, it will be apparent to those skilled in the art that changes and modifications can be made without departing from the spirit of the present invention. It is therefore intended to encompass within the appended claims all such changes and modifications that fall within the scope of the present invention.

What is claimed is:

1. An optical tracking device for tracking a light target, said device comprising:
    (a) transparent light splitter means positioned to receive a light beam from a light source and to refract and divide the beam into three individual output light beams, the splitter means having an axis and a transverse planar surface perpendicular to the axis and including three inclined intersecting planar faces that are inclined relative to the axis at substantially the same angles to define a three sided pyramidal structure that includes a sharply pointed apex; and
    (b) receptor means for receiving the output light beams that emanate from the light receiving and transmitting means and for providing an output signal representative of the intensity of the respective individual light beams that impinge upon the receptor means.

2. An optical tracking device in accordance with claim 1, including light receiving and transmitting means positioned adjacent the transverse planar surface for receiving individual output light beams passing through the transverse planar surface of the splitter means and for conveying the respective individual output beams to the receptor means.

3. An optical tracking device in accordance with claim 1, including lens means positioned between the light source and the splitter means.

4. An optical tracking device in accordance with claim 3, wherein the lens means is a converging lens.

5. An optical tracking device in accordance with claim 2, wherein the light receiving and transmitting means include a plurality of optical fibers for receiving respective output light beams from the splitter means and for transmitting the respective output light beams to the receptor means.

6. An optical tracking device in accordance with claim 1, wherein the receptor means include radiant energy detectors for providing output signals proportional to the intensity of the respective individual output light beams.

7. An optical tracking device in accordance with claim 1, including electronic circuit means for receiving output signals from the receptor means and for providing amplified output signals.

8. An optical tracking device in accordance with claim 7, wherein the electrical circuit means includes control circuit means responsive to the amplified output signal for providing control signals for repositioning the splitter means to a desired position.

9. An optical tracking device in accordance with claim 8, including servo means operatively connected with the control circuit means and responsive to the control signals for repositioning the splitter means to track the light target.

10. A method of detecting the lateral shift of a light source from an initial position, said method comprising:

(a) providing a three-sided transparent pyramid for receiving and transmitting an incoming light beam and for dividing the incoming light beam into three output light beams, the pyramid having a transverse planar surface at one end and three planar surfaces inclined relative to the transverse planar surface at an opposite end and facing the incoming light beam for refracting the incoming light beam to provide the three output light beams;

(b) transmitting the respective output light beams to individual light receptors;

(c) determining the relative intensities of the output light beams received by the light receptors;

(d) adjusting the position of the transparent pyramid laterally relative to the incoming light beam until the respective intensities of the output light beams are substantially equal.

* * * * *